(12) United States Patent
Jackson (10) Patent No.: US 9,073,585 B2
(45) Date of Patent: Jul. 7, 2015

(54) LIGHT WEIGHT ELECTRIC VEHICLE (71) Applicant: Blair Douglas Jackson, Troy, OH (US)

(72) Inventor: Blair Douglas Jackson, Troy, OH (US)

(*) Notice: Subject to any disclaimer, the term of this patent is extended or adjusted under 35 U.S.C. 154(b) by 0 days.

(21) Appl. No.: 14/098,645

(22) Filed: Dec. 6, 2013

(65) Prior Publication Data

US 2015/0158534 A1 Jun. 11, 2015

(51) Int. Cl.
*B60K 1/00* (2006.01)
*B62D 31/00* (2006.01)
*B62D 11/04* (2006.01)
*B60K 26/02* (2006.01)
*B60T 7/06* (2006.01)
*B62D 29/04* (2006.01)

(52) U.S. Cl.
CPC ............ *B62D 31/006* (2013.01); *B62D 11/04* (2013.01); *B60K 26/02* (2013.01); *B60T 7/06* (2013.01); *B62D 29/041* (2013.01)

(58) Field of Classification Search
USPC .................................. 180/65.1, 65.51, 65.31
See application file for complete search history.

(56) References Cited

U.S. PATENT DOCUMENTS

| | | | |
|---|---|---|---|
| 2,972,498 A | 2/1961 | Kelley | |
| 3,388,761 A | 6/1968 | Arpin | |
| 3,905,618 A | 9/1975 | Miranda | |
| 4,087,106 A | 5/1978 | Winchell | |
| 4,875,536 A | 10/1989 | Saur | |
| 5,284,355 A | 2/1994 | Ishii | |
| 5,348,326 A | 9/1994 | Fullenkamp | |
| 5,957,482 A | 9/1999 | Shorter | |
| 6,843,500 B2 | 1/2005 | Li | |
| 6,845,829 B2* | 1/2005 | Hafendorfer | 180/6.48 |
| 7,017,694 B2* | 3/2006 | Shirazawa | 180/65.51 |
| 7,100,728 B2* | 9/2006 | Huang et al. | 180/181 |
| 7,293,622 B1* | 11/2007 | Spital | 180/181 |
| 7,426,970 B2* | 9/2008 | Olsen | 180/65.1 |
| 7,438,145 B2* | 10/2008 | Shin | 180/65.1 |
| 7,757,794 B2* | 7/2010 | Heinzmann et al. | 180/6.5 |
| 7,896,385 B2 | 3/2011 | Every | |
| 7,926,606 B2 | 4/2011 | Wang | |
| 7,946,963 B1 | 5/2011 | Schreiner | |
| 8,210,555 B2 | 7/2012 | Belenkov | |
| 8,286,738 B2* | 10/2012 | Cheng | 180/24.02 |
| 8,388,006 B2 | 7/2013 | Benoit | |
| 8,727,048 B2* | 5/2014 | Jurkiewicz et al. | 180/65.1 |
| 8,733,479 B2* | 5/2014 | Holland et al. | 180/65.1 |
| 8,931,583 B2* | 1/2015 | Tuckowski et al. | 180/65.1 |
| 2002/0005303 A1* | 1/2002 | Haringer | 180/9.1 |
| 2004/0084230 A1* | 5/2004 | Grymko et al. | 180/65.1 |
| 2004/0262055 A1* | 12/2004 | Bancroft | 180/65.1 |
| 2007/0039766 A1* | 2/2007 | Jackson et al. | 180/65.1 |
| 2007/0114079 A1* | 5/2007 | Chao | 180/65.1 |
| 2008/0053720 A1* | 3/2008 | Chen et al. | 180/65.1 |
| 2008/0083573 A1* | 4/2008 | Tseng | 180/65.1 |
| 2011/0083914 A1* | 4/2011 | Art et al. | 180/65.1 |
| 2011/0253464 A1* | 10/2011 | Chen | 180/65.1 |
| 2012/0259491 A1* | 10/2012 | Kurakawa et al. | 701/22 |

* cited by examiner

*Primary Examiner* — Jeffrey J. Restifo
*Assistant Examiner* — Erez Gurari
(74) *Attorney, Agent, or Firm* — Robert William Graham (57) ABSTRACT

A light weight collapsible electric vehicle includes a seat, a flexible and supportive frame connected to the seat, a rear axle connected to a rear of the frame, a front cross member connected to a front of the frame, a front wheel connected to the front cross member, a rear wheel connected to the rear axle, the front cross member includes a pair of foot pedals which are operably connected to a power source and drive motors which are connected to two or more of the wheels, wherein actuation of the foot pedals in a predetermined manner causes rotation of one or more wheels and wherein the foot pedals provide steering control.

30 Claims, 10 Drawing Sheets

LIGHT WEIGHT ELECTRIC VEHICLE

BACKGROUND OF THE INVENTION

1. Field of the Invention

This invention relates to open chassis man operated vehicles and, more particularly, to one that features a powered flexible light weight chassis which folds to facilitate the handiness in use and storage.

2. Description of the Prior Art

"Motorized carts" referred to herein embrace four-wheeled vehicles as well as motor-driven-wheeled vehicles and electric carts. There are numerous motorized carts powered by battery and/or gas. In the case of such motorized carts, these typically have a structurally rigid frame, operably connected wheels, axles, power train and steering wheel or joy stick connected to a steering column or connection.

These carts can be equipped with a shock absorbing member to soften the ride of such vehicles. Prior art cart designs which add shock absorbing members added additional weight to the cart. These vehicles are often quite heavy and not easily transported by one individual. Moreover, these rigid carts are not easily stored in one's garage as they tend to take up a significant amount of space.

One prior art discloses a motorized skate board which is controlled by one's feet. Steering is like a conventional skateboard and throttle is by tipping the entire board rather than two separate pedals as with the subject design.

SUMMARY OF THE INVENTION

An objective of this invention is to provide a light weight collapsible electric vehicle.

Another objective is to provide a light weight collapsible electric vehicle for improved surfaces rather than rough terrain.

Still another objective is to provide an open chassis man operated electric cart with a flexible chassis.

Another objective is to provide a light weight electric vehicle with an x-shaped frame.

Yet another objective is to provide an electric vehicle cart which is fully controlled by the feet of the driver.

Another objective of the invention provides a steering wheel free and hands free vehicle.

The invention also provides both steering and braking of a vehicle through two foot pedals.

Another objective is to provide throttle control through two foot pedals that also provide steering.

Accordingly, one aspect of the invention is directed to light weight electric vehicle. The light weight electric vehicle includes a seat connected to a pair of hinged structural parts which are in turn connected to flexible and supportive frame which in turn operatively connects to a front cross member and a rear axle which in turn operatively connect to front and rear wheels respectively.

A front cross member is provided and includes a pair of foot pedals which are operably connected to a power source and drive motors connected to two or more of the wheels, wherein actuation of foot pedals in a predetermined manner causes rotation of one or more wheels. Additionally, one or both foot pedals are operably connected to a brake mechanism which is operably connected to one or more wheels for stopping the vehicle upon actuation of such pedal in a predetermined manner. The foot pedals are mounted on slides that are operatively connected to the front wheels. Sliding one pedal forward and the other pedal back results in the front wheels turning and steers the vehicle. Thus an operator of the vehicle can control movement, direction and stopping of the vehicle solely by actuation of the pedals.

Another aspect of the vehicle is that the seat can be removed or folded. The frame can comprise a front and back frame section which are hingedly connected. These features provide folding for its wheels to assume an adjacent position and enable storage or ease of portability in another larger vehicle, such as a car trunk.

DETAILED DESCRIPTION OF THE INVENTION

Figure 1:
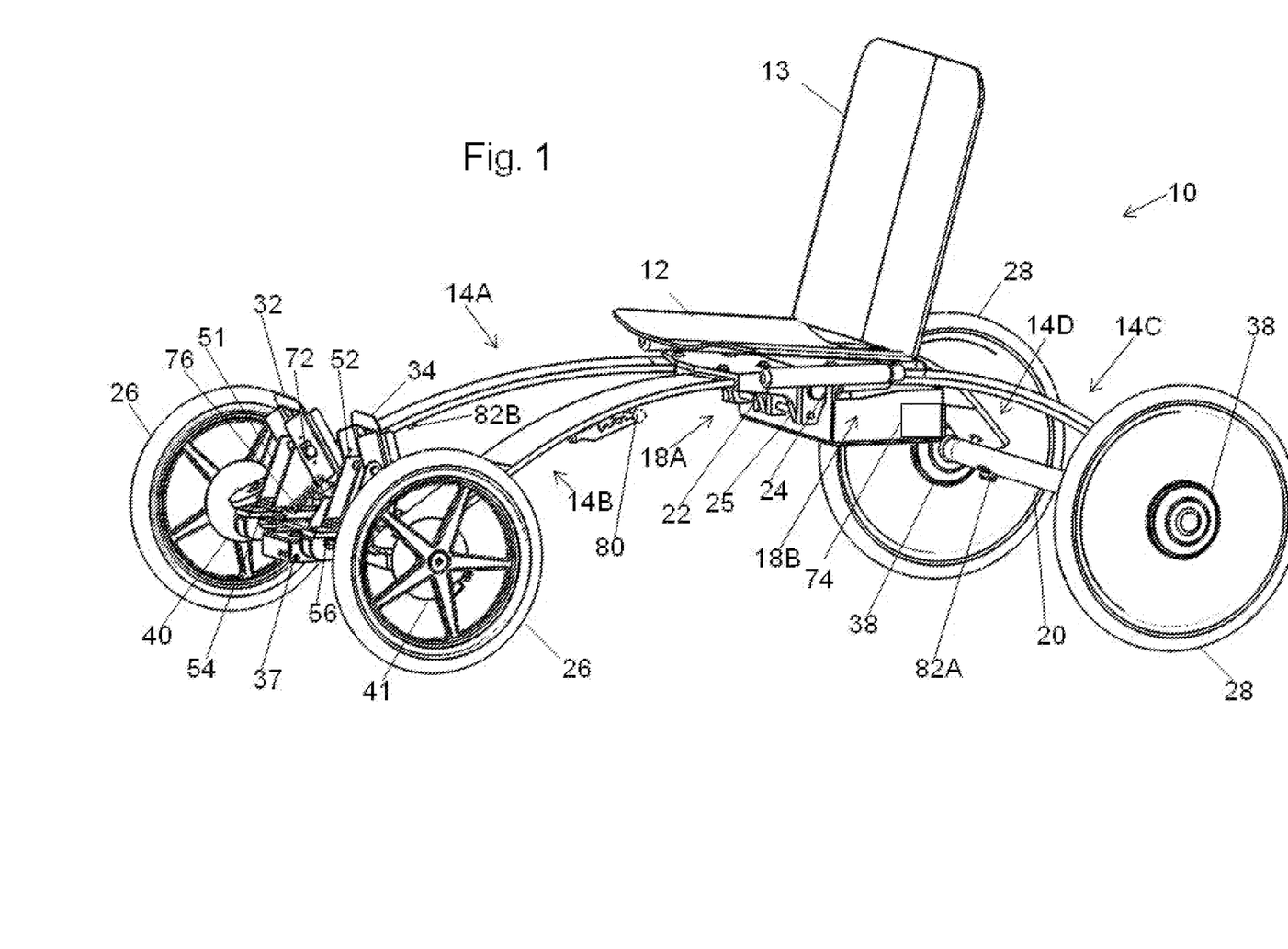
FIG. 1 is a perspective view according to the present invention.
Figure 2:
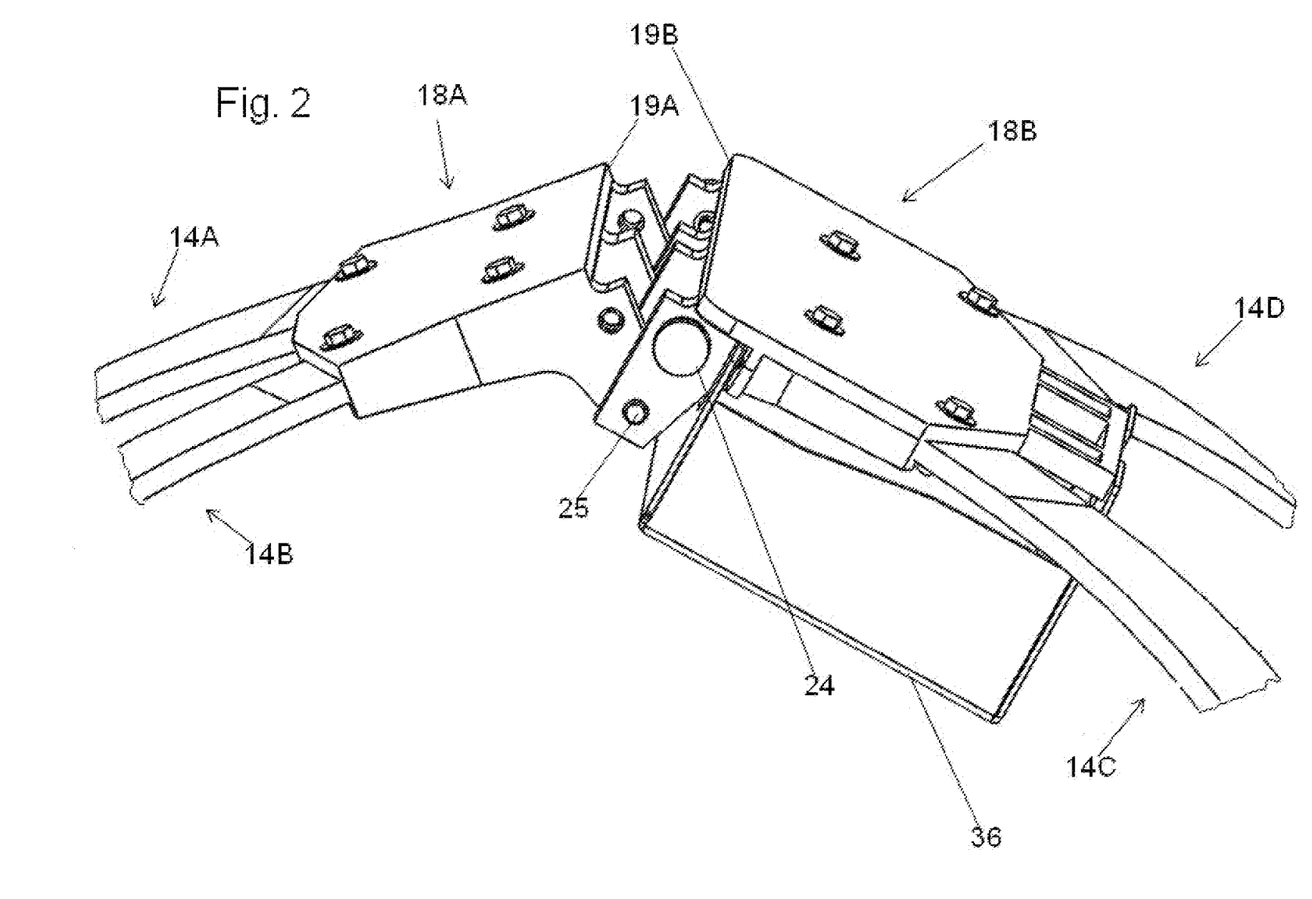
FIG. 2 is a side view of partially folded hinged support frame and arcuate flexible limbs according to the present invention.

Referring now to the drawings, the light weight collapsible electric vehicle is generally referred to by the numeral 10. The light weight collapsible electric vehicle 10 includes a seat 12 and seat back 13 preferably removably connected to a seat supportive frame 18. The front seat supportive frame 18A is connected by a hinge to a rear seat supportive frame 18B. The front 18A and rear seat supportive frame 18B are connected to a flexible and supportive arcuate frame (14A-D). The frame 14A-D includes an X-frame vehicle structure which relies on each of four arcuate flexible limbs 14A, 14B, 14C and 14D to fully support a load while preferably providing 100% of the spring rate and damping and is a unique aspect to the invention. An aspect of the vehicle 10 is that the seat 12 and seat back 13 can be removed or folded as described hereinafter. The arcuate limbs 14A and 14B operatively interconnect to front cross member 16 and a front portion 18A of a seat support frame (18A and 18B) and arcuate limbs 14C and 14D operatively interconnect to rear axle 20 and a back portion 18B of seat support frame 18A and 18B. Limbs 14A and 14B extend from front portion 18A in a V-shape and limbs 14C and 14D extend from back portion 18B in a V-shape. Front portion 18A and back portion 18B can be hingedly connected and secured using a locking pin 24, for example. This is shown in FIG. 2. These features provides folding for its wheels 26 and 28 to assume an adjacent position and enable storage or ease of portability in another larger vehicle, such as a car trunk.

The front cross member 16 is operatively connected to front wheel 26 and axle 20 is operatively connected to rear wheel 28. The front cross member 16 includes a pair of foot pedals 32 and 34 which are operably connected via electrical connection to a power source 36 and drive motors 38 connected to wheels 28, wherein actuation of foot pedals 32 and 34 in a predetermined manner causes rotation of one or more wheels 28. Additionally, one or both foot pedals 32 and 34 are operably connected to a brake mechanism 40 and 41 which is operably connected to one or more wheels 26 for stopping the vehicle 10 upon actuation of such pedal 32 and/or 34 in a predetermined manner. Thus, an operator of the vehicle 10 can control movement, direction and stopping of the vehicle 10 solely by actuation of the pedals 32 and 34 as will be described hereinafter.

The drive motors 38 can include a hub motor in each of the rear two wheels 28 as depicted in FIG. 1. It is contemplated that additional hub motors can also be operably connected in the front wheels 26 as well.

The entire weight of the driver is supported by four structural members referred to above arcuate flexible limbs 14A-D. These four limbs 14A-D provide both a spring rate and a damping of a suspension system for the vehicle 10. The four limbs 14A-D react all vertical and side loads. The four limbs 14A-D can be made of composite laminate materials similar to snow skies and snow boards, for example, such as polymer plastic and/or metal.

Figure 3A:
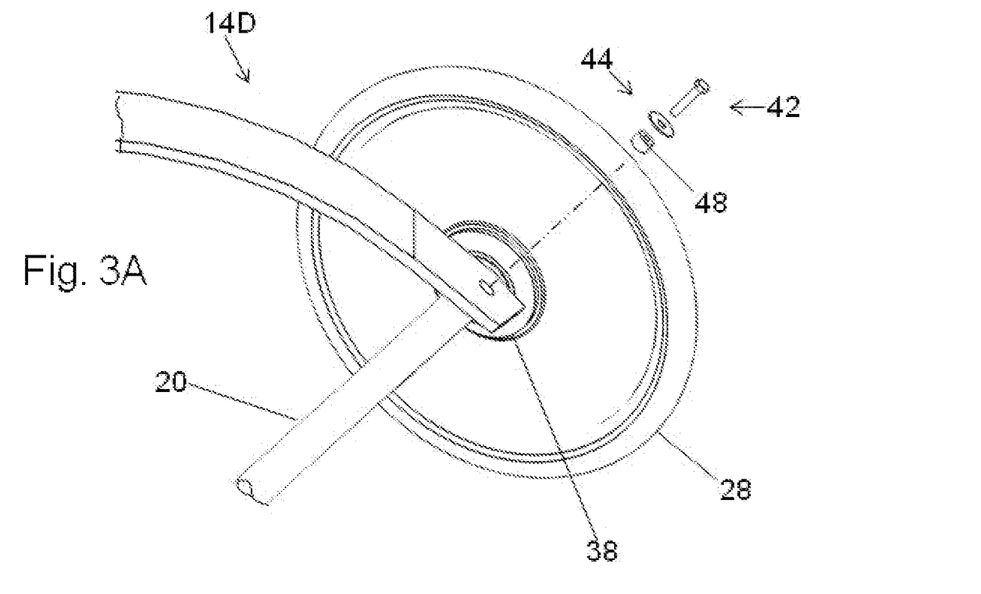
FIG. 3A is a perspective view showing attachment of limbs to axle according to the present invention.
Figure 3B:
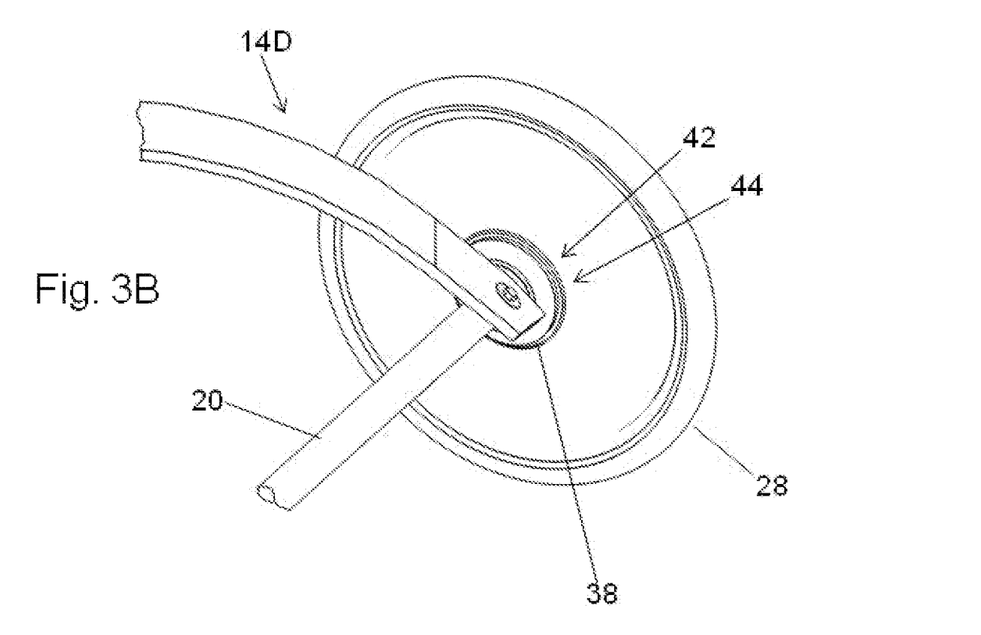
FIG. 3B is a perspective view showing assembly of limbs to axle according to the present invention.

Each of the four limbs 14A-D can be secured to rear axle tube 20 or the front cross member 16 through use of bolt 42 and oversized washer 44. An oversized hole can be provided in each of the four limbs 14A-D to accommodate grommet 48, see FIG. 3. This configuration developed accommodates angular deflections between each of the four limbs 14A-D and the mating part resulting from applying the weight of the driver or a rough or uneven driving surface. The invention provides unique four limbs 14A-D forming an x-structure. The limbs 14A-D directly react all vertical and lateral forces on the vehicle 10 and provide the appropriate spring rate and damping for the vehicle 10. Two limbs 14A and 14B fully support a front cross member assembly 16 and two limbs 14C and 14D supports a rear axle assembly 20.

Figure 4:
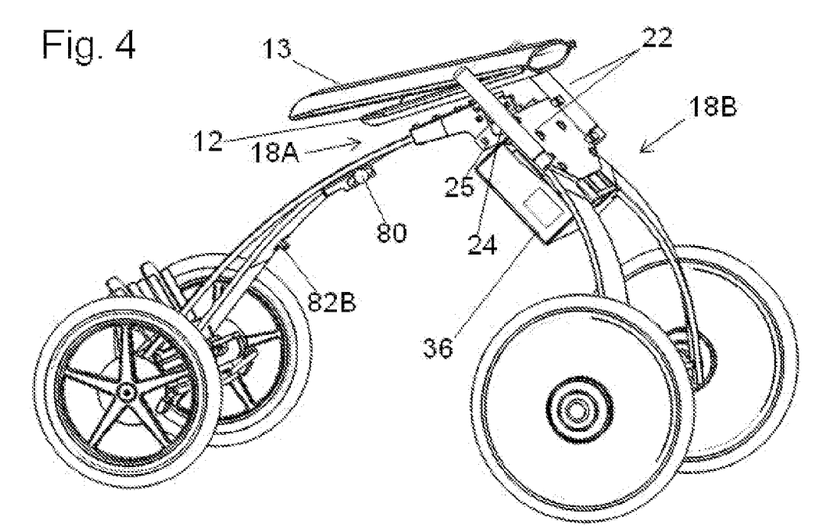
FIG. 4 is a perspective view illustrating folding of the present invention.
Figure 5:
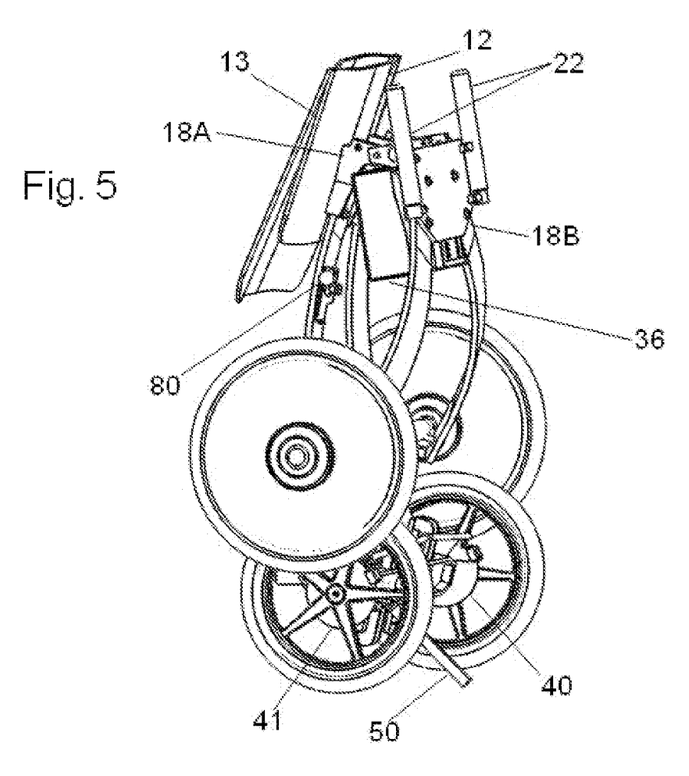
FIG. 5 is a perspective view illustrating the present invention fully folded.

The vehicle 10 folds in the middle as shown in FIGS. 4 and 5 where front seat support frame 18A and back seat support frame 18B hingedly connect to enable storage when not in use. The front wheels 26 nest partially among the rear wheels 28 when the vehicle 10 is fully folded. The folded vehicle 10 can be rolled around on two wheels and stored vertically using a kick stand 50 as seen in FIG. 5. While in the folded configuration, the vehicle 10 assumes a position no thicker than the diameter of the rear wheels 26 to facilitate transporting as well as storage. The middle folding structure of the frame 14A-D is designed with a high offset between the hinge pin 25 and the mating face 19A of front seat support frame 18A and the mating face 19B of the back seat support frame 18B as illustrated in FIG. 2. The mating faces 19A and 19B contact when the vehicle 10 is fully unfolded and prevents any further rotation of the front seat support frame 18A and back seat support frame 18B when the weight of the driver is applied. The two structural parts 18A and 18B where the limbs come together can be cast aluminum, for example. Indexing locking pin 24 locks the vehicle 10 in an unfolded position. The vehicle 10 will operate without the without the locking pin 24 engaged.

FIG. 1 depicts the vehicle unfolded with seat back 13 upright and ready for driving. The locking pin 24 can be a cam actuated indexing pin on each side of the vehicle 10 that keeps the vehicle fully unfolded while in operation.

Figure 7:
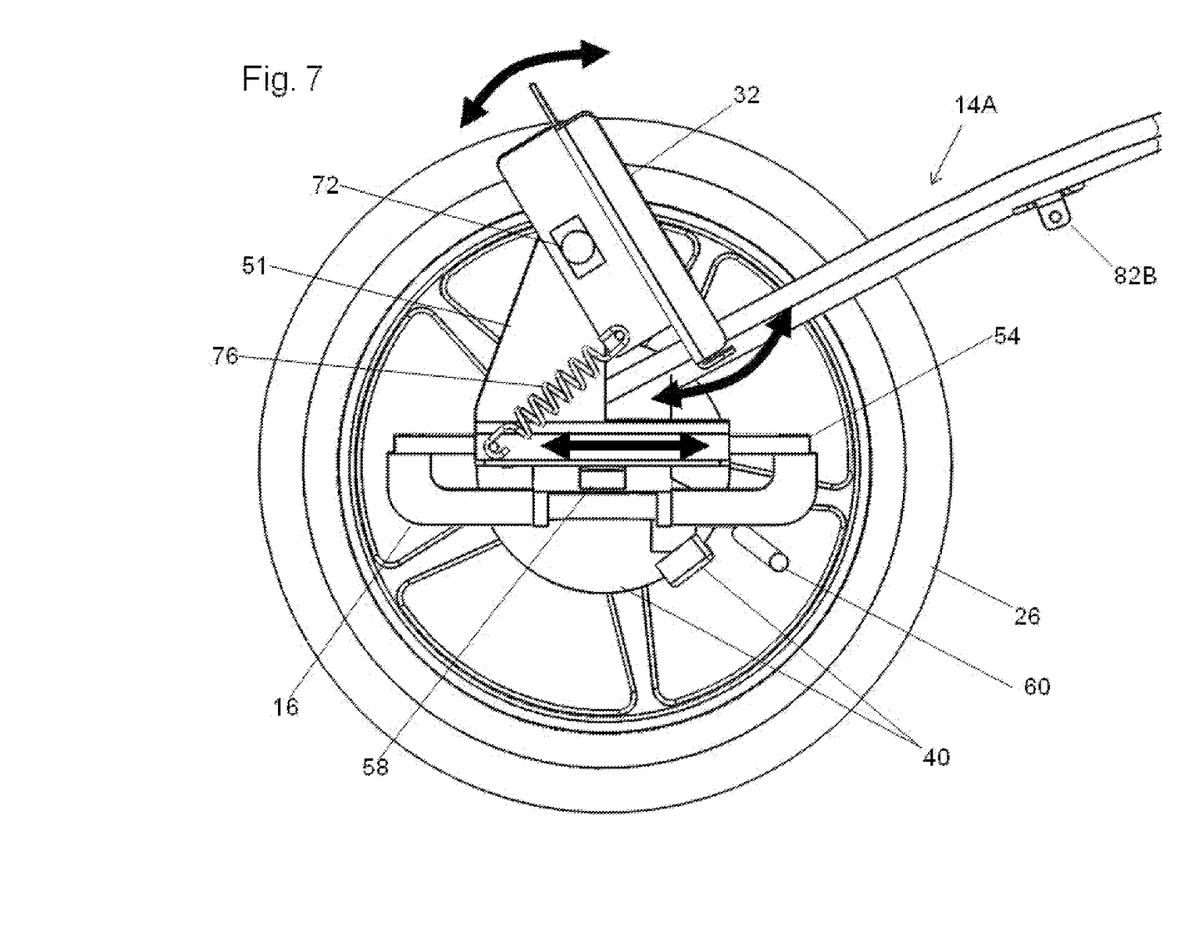
FIG. 7 is a section view of the front cross member showing degrees of freedom of foot pedals according to the present invention.
Figure 8:
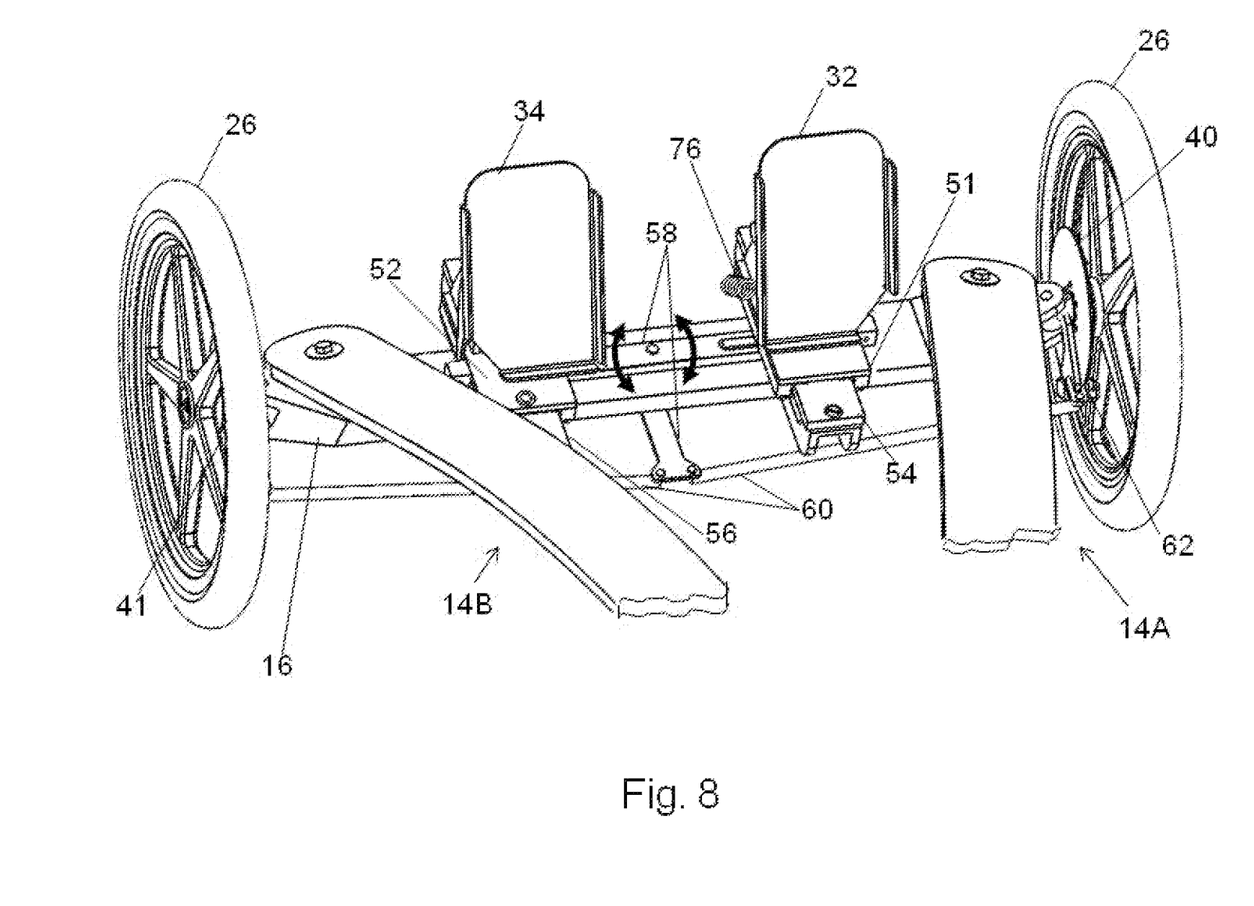
FIG. 8 is a perspective view illustrating steering components (with small display, brake cables and bake cable junction assembly removed) according to the present invention.

The steering, throttle control and braking is provided solely from two foot pedals 32 and 34. These foot pedals 32 and 34 provide a means to change the direction of the hub motors 38 providing hands free shifting from forward and reverse. Each pedal 32 and 34 has two degrees of freedom. Each of the two pedals 32 and 34 are attached to pedal mounts 51 and 52, respectively that ride on a slide 54 and 56, respectively. This permits forward and aft movement of the pedals 32 and 34 being the first degree of freedom for steering shown in FIG. 7 by the horizontal straight arrow. The pedal mounts 50 and 52 are mechanically connected by a cross arm and pin assembly 58 that rotates about a vertical axis as indicated by the curved arrows in FIG. 8 when the pedals 32 and 34 are slid forward or aft. The cross arm and pin assembly 58 is attached to two tie rods 60 that connect to a steering arm 62 at each front wheel 26. Steering is provided by the driver extending one leg further forward while retracting the other.

Figure 9:
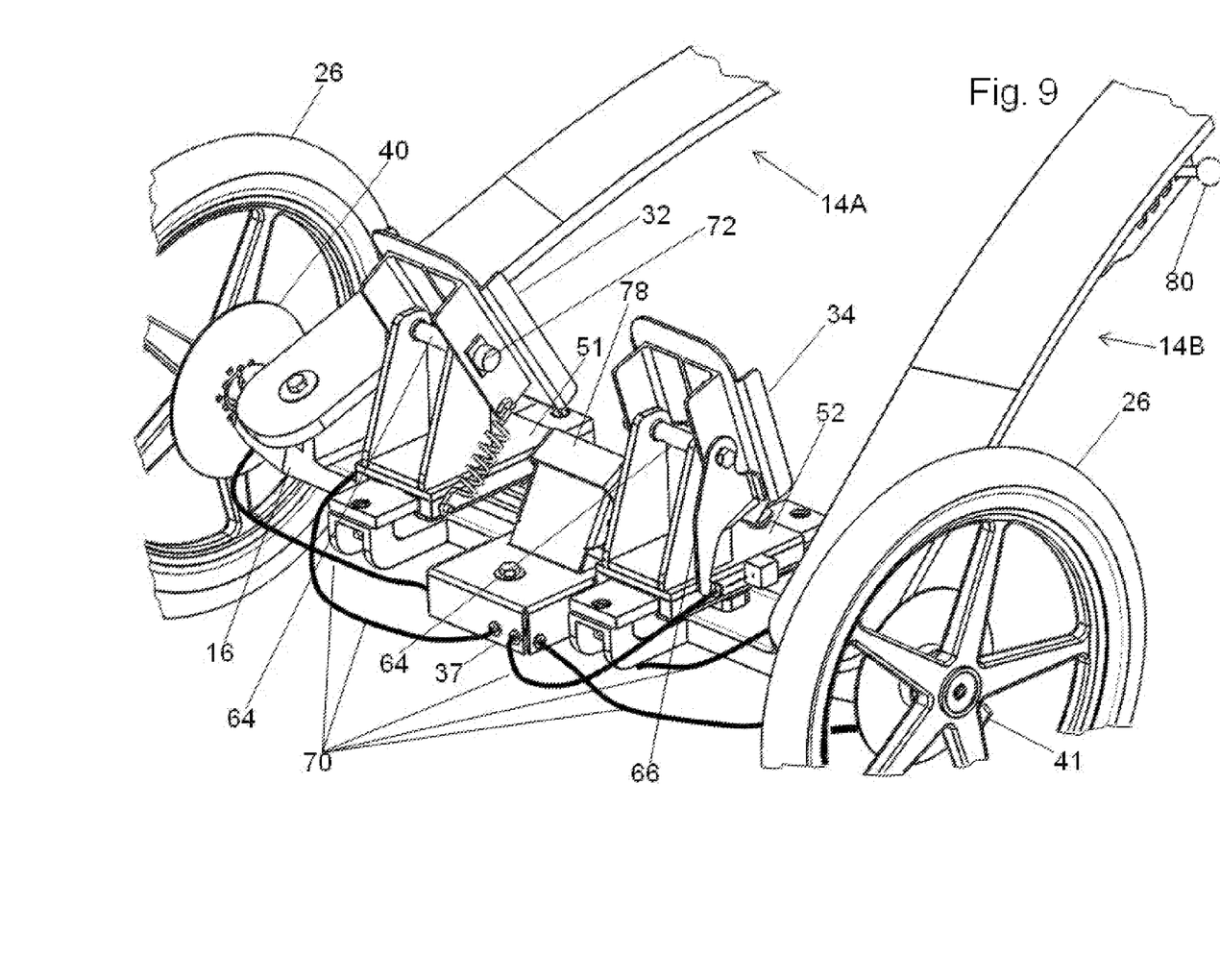
FIG. 9 is a perspective view illustrating control throttle and braking components according to the present invention.

The connection between each pedal 32 and 34 and pedal mount 51 and 52, respectively, is through a pin 64 shown in FIG. 9. This allows the pedals 32 and 34 to tip back and forth for the second degree of freedom to provide throttle control and braking as shown by the curved arrows in FIG. 7. This occurs when the driver advances his toe and retracting his heal of vice versa.

Figure 10:
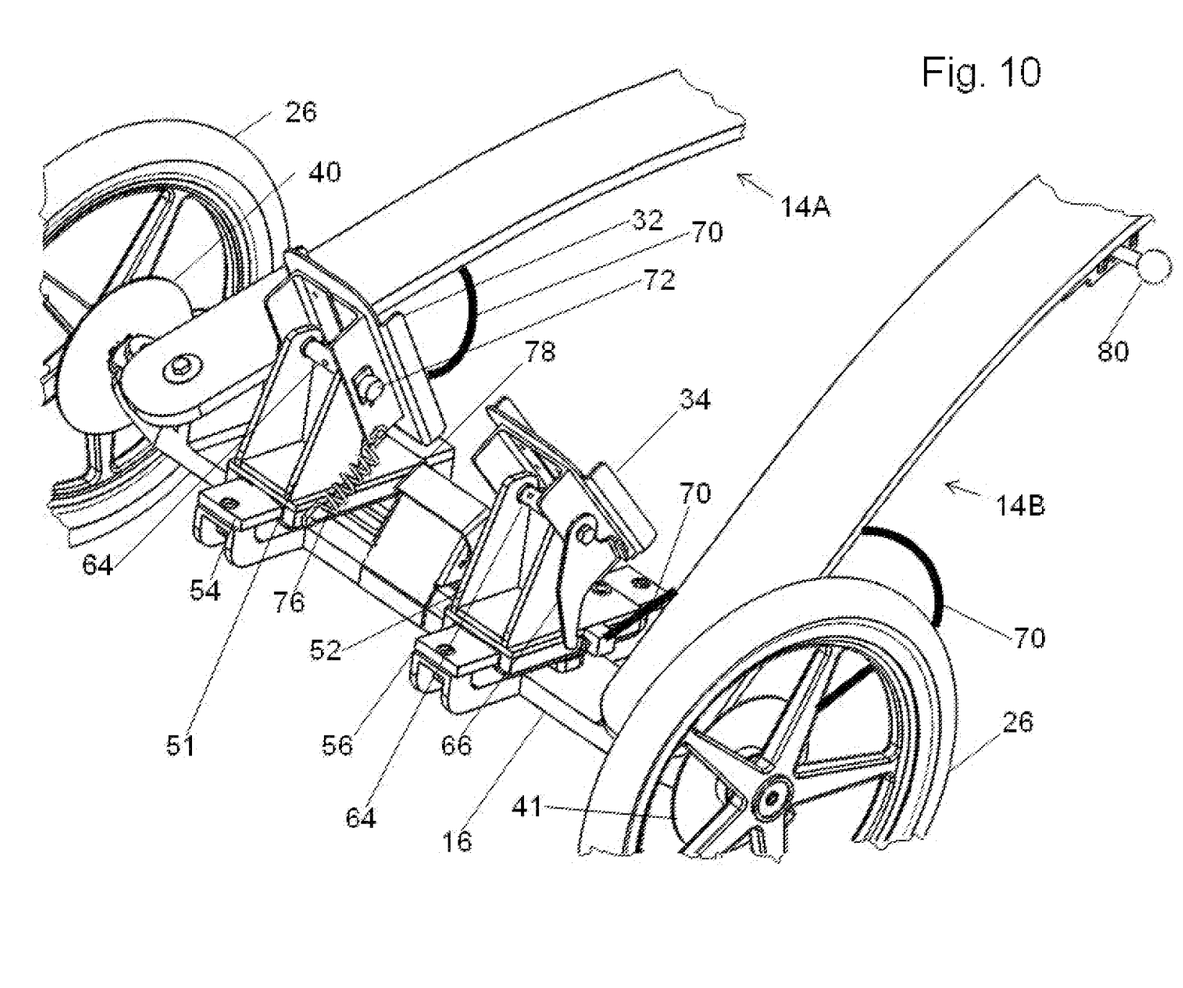
FIG. 10 is a perspective view of an alternate configuration of the brake cables according to the present invention.

The brakes 40 and 41 are actuated by two brake levers 66 one on each pedal mount 51 and 52 shown in FIG. 9 that pulls a bicycle like cables 70 when pedal 32 or 34 is tipped back beyond a predetermined angle. These brake cables 70 transmit the displacement of the brake levers 66 or the parking brake handle 80 to the brake cable junction assembly 37. Additional brake cables 70 further transmit the displacement from the assembly 37 to the brakes 40 and 41. An alternate configuration of the brake cables 70 is shown in FIG. 10 where a cable 70 is routed directly from the right pedal mount 51 to the right brake 40 and another brake cable is routed from the left pedal mount 52 to the left brake 41.

The throttle is controlled in a similar fashion yet by tipping the pedals 32 and 34 forward. Each pedal 32 and 34 has a rotational sensor 72 (either a potentiometer or a Hall sensor) located at pin 64. This measures the angle of the displacement of each pedal—see FIG. 7.

The pedals 32 and 34 can be tilted at different angles from one another as there is no mechanical linkage between the tilt angle of the left and right pedal 32 and 34. The driver is to keep the tilt angles of the pedals 32 and 34 roughly the same for braking and throttle control. The only exception is for changing from forward to reverse which is described later in this section. The above mentioned sensors 72 are wired to a micro controller 74 on the vehicle 10. Controller 74 continually samples the angular displacement of each pedal 32 and 34. Software in the controller 74 uses the lesser of the two pedal 32 and 34 tipping angles to determine the throttle setting for the above mentioned hub motors 38. This provides a safety feature in that if one of the pedals 32 and 34 is unintentionally tipped forward the controller 74 will not throttle up the vehicle 10 since the other pedal is still back. Also, if there is a fault in one of the signals from a pedal, the controller 74 will not advance the throttle beyond the setting requested by the other pedal. There is a spring 76 on each pedal 32 and 34 that tilts the pedals 32 and 34 back to a position that decelerates the vehicle 10 in the event the driver removes one or both of his feet from the pedals 32 and 34 as shown in FIGS. 9, 10 and 11.

Figure 11:
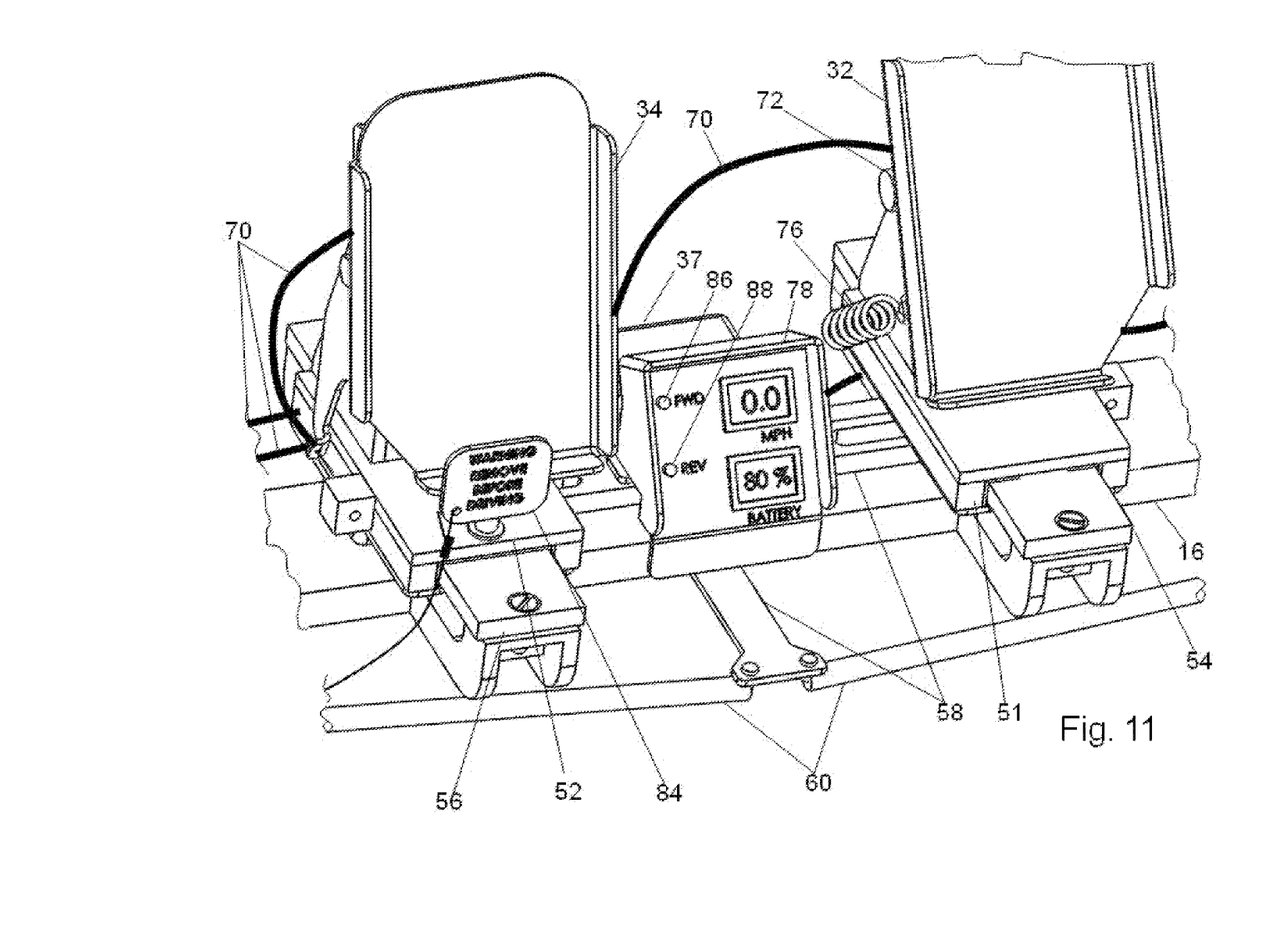
FIG. 11 is a perspective view of small display and steering locking pin according to the present invention.

There is a small display 78 between the foot pedals including two high intensity Light Emitting Diodes (LED's) as shown in FIG. 11. When the vehicle 10 is powered up and in forward, the top white LED 86 is illuminated. When in reverse, the lower LED 88 flashes red.

While other methods can be envisioned, an exemplary method to change the direction (forward-reverse) is disclosed, the driver tilts the pedals 32 and 34 in opposite directions cycling them back and forth three times within four seconds. The controller 74 continuously monitors for this type of input but only accepts the change in motor direction if there is no rotational speed on the rear wheels 28. At that point the logic is switched and the driver observes this through the changing of the above mentioned LED's. The next time both pedals 32 and 34 are tipped forward, the vehicle 10 will be driven in the opposite direction. FIG. 11 shows the above mentioned small display 78 with LED's 86 and 88 as well as the two foot pedals 32 and 34 for controlling the steering of the front wheels 26 as well as the braking and throttle.

By so providing, the instant invention provides various features that are considered novel as well as of strategic value on the marketing of the above design and future derivatives.

The invention is envisioned for a one person electric vehicle with four wheels—see FIG. 1. However, it is contemplated that the invention may accommodate two people or use of 3 wheels. The vehicle 10 folds in the middle and the front wheels 16 and back wheels 20 nest partially within one another for reduced storage space and to simplify handling.

A derivative vehicle design may accommodate a driver and a passenger sitting side by side. The limb configuration, control scheme and folding may be similar to that described above yet an additional means of collapsing is contemplated. This would be provided by the front limbs folding together and reducing the width and the rear limbs doing the same. This can be done collapsing of a two person vehicle with a single electromechanical actuator. The subject one person vehicle does not have an electromechanical actuator yet a spring damper can be added if warranted.

The invention is to provide a mobility aid that looks like anything but a mobility aid and is fun to drive. The invention provides a steering wheel free and hands free vehicle. The steering can be locked in a straight forward orientation by the insertion of the pin 84 into a hole in the pedal mount 52 and also through a concentric hole in the slide 56. This prevents any forward or aft movement of both pedal mounts 51 and 52 and locks the steering. It also prevents the tipping of one of the pedals forward and prevents the motors 38 from being powered up even if the vehicle is on. The pin 84 includes a placard listing a warning and a recoiling lanyard that keeps the pin under the limb 14B while the pin is removed and the vehicle in use. FIG. 11 shows the pin 84 locking the steering as described above.

When folded, the maximum thickness of the vehicle (with seat collapsed) is no greater than the diameter of the wheels. Prior to folding, the steering is locked in a straight forward orientation with pin 84 as described above to facilitate rolling around on two wheels. The vehicle 10 includes handles 22 on the right and left side of the seat 12. The handles 22 are used for new drivers and when navigating more challenging maneuvers. When the vehicle is folded in a collapsed configuration as show in FIG. 5, the handles 22 are instrumental for rolling the vehicle 10 around on two wheels.

Vehicle 10 has a kick stand 50 that keeps the folded vehicle vertical for storage. The parking brake 80 can be applied or released while the driver is sitting in the seat 12 as shown in FIG. 1 or while the vehicle is in the folded configuration as shown in FIG. 5. This greatly facilitates handling and storage of the vehicle while on two wheels. The parking brake handle 80 has a cable 70 that connects to the above mentioned brake cable junction assembly 37. This allows actuation of the brakes 40 and 41 through either the foot pedals 32 and 34 or through the parking brake handle 80.

Figure 6:
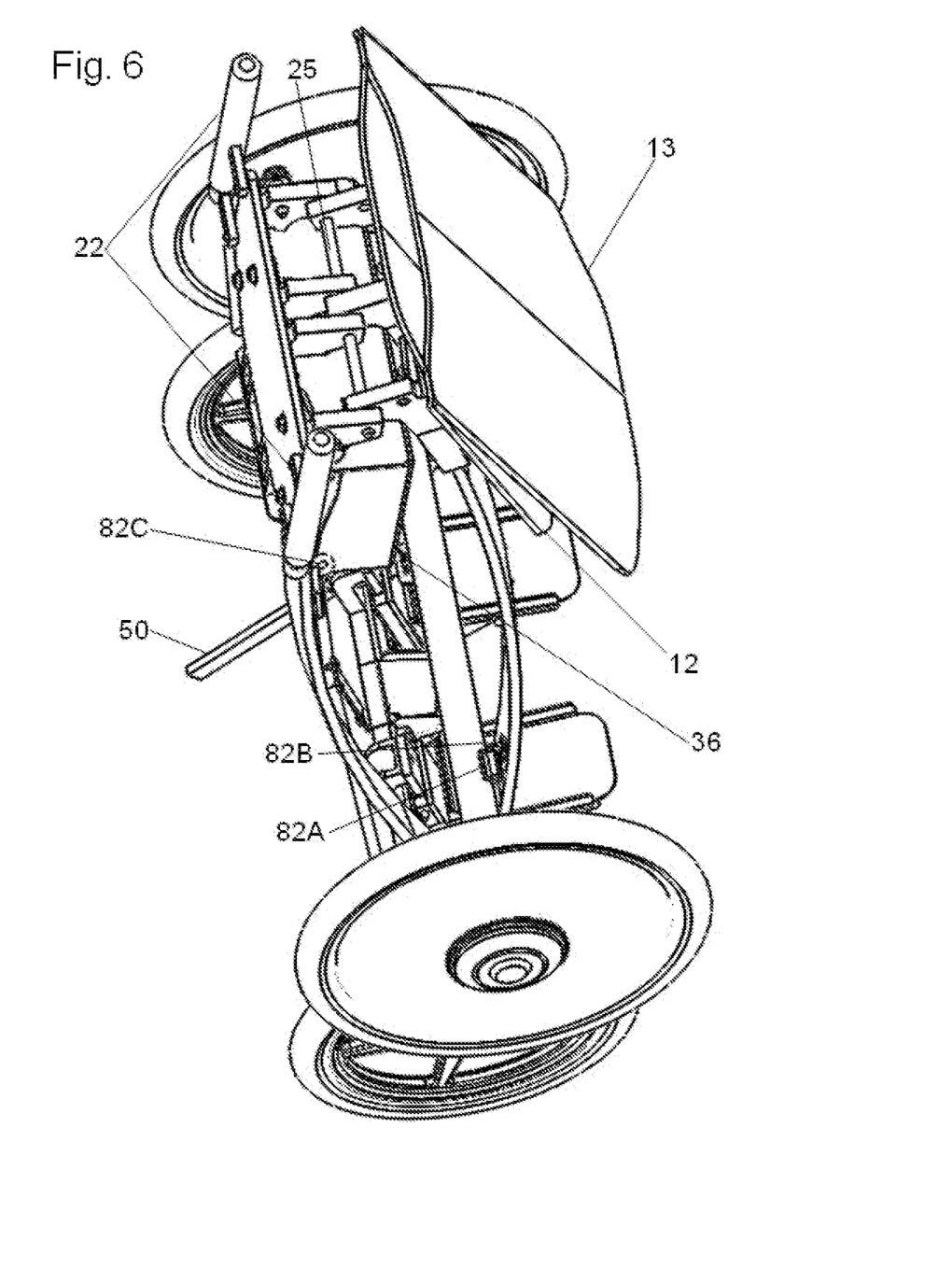
FIG. 6 is a downward looking view illustrating the present invention fully folded.

The operation of brakes 40 and 41 can be performed through either the above mentioned brake cables 70 or through hydraulic brake lines now found on high end performance bicycles. There is a locking mechanism 82A-C that keeps the vehicle folded to facilitate handling on two wheels. One part of this mechanism 82B is on the front half of the vehicle as shown in FIG. 4. The mating part of the locking mechanism 82A is on the back half of the vehicle. Parts 82A and 82B keep the vehicle folded until the operator pulls the release handle 82C shown in FIG. 6 to unfold the vehicle.

There is design space and connecting points for a storage bag capable of holding two bags of groceries behind the driver and between the rear wheels. Ideally, the power source 16 can be a battery and provide speed of about 15 mph on a level surface. The invention is contemplated to have an empty (no load) weight of 95 pounds or less.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. A light weight electric vehicle, which includes:
   a seat;
   a flexible and supportive arcuate frame connected to said seat;
   a rear axle connected to a rear of said frame;
   a front cross member connected to a front of said frame;
   at least one front wheel connected to said front cross member;
   at least one rear wheel connected to said rear axle; and
   said cross member which includes a pair of foot pedals which are operably connected to a power source and at least one drive motor which is connected to at least one of said wheels, wherein actuation of said foot pedals in a predetermined manner causes rotation of at least one of said wheels.

2. The light weight electric vehicle of claim 1, wherein at least one said foot pedal is operably connected to a brake mechanism which is operably connected to at least one wheel for stopping said vehicle upon actuation of such pedal in a predetermined manner.

3. The light weight electric vehicle of claim 1, wherein said seat is removably connected to said frame.

4. The light weight electric vehicle of claim 1, wherein said seat is foldable.

5. The light weight electric vehicle of claim 1, wherein said frame includes a front frame section and back frame section which are hingedly connected to permit said frame to be folded and unfolded.

6. The light weight electric vehicle of claim 1, wherein said front frame section and said back frame section each include a pair of limbs which connect to generally form a V-shape.

7. The light weight electric vehicle of claim 5, wherein said front frame section and said back frame section each include a pair of limbs which connect to generally form a V-shape.

8. The light weight electric vehicle of claim 7, when said vehicle is unfolded said frame is generally X-shaped.

9. The light weight electric vehicle of claim 1, wherein said frame is made of one of a composite laminate material and tubular metal material.

10. The light weight electric vehicle of claim 6, wherein said limbs are made of one of a composite laminate material and tubular metal.

11. The light weight electric vehicle of claim 1, wherein said frame includes a pair of handles that can be used while the vehicle is driven or while the vehicle is folded.

12. The light weight electric vehicle of claim 1, wherein said frame includes a parking brake handle that can be accessed while the driver is sitting in said vehicle and while said vehicle is folded.

13. The light weight electric vehicle of claim 1, wherein said frame includes a kickstand.

14. The light weight electric vehicle of claim 1, wherein said drive motor independently drives rotation of a wheel.

15. The light weight electric vehicle of claim 1, which is further characterized such that said foot pedals are movable for controlling steering, throttle control and braking.

16. A light weight electric vehicle, which includes:
   a seat;
   a frame which is flexible and assuming a supportive arcuate shape connected to said seat;
   a rear axle connected to a rear of said frame;
   a front cross member connected to a front of said frame;
   at least one front wheel connected to said front cross member;
   at least one rear wheel connected to said rear axle; and
   said front cross member includes a pair of foot pedals which are operably connected to a power source and at least one drive motor which is connected to at least one of said wheels, wherein actuation of said foot pedals in a predetermined manner causes rotation of at least one of said wheels and wherein said foot pedals are movable for controlling steering, throttle control and braking.

17. The light weight electric vehicle of claim 16, which includes a seat removably connected to a frame part of said vehicle.

18. The light weight electric vehicle of claim 17, wherein said seat is foldable.

19. The light weight electric vehicle of claim 16, wherein said vehicle includes a frame having a front frame section and back frame section which are hingedly connected to permit said frame to be folded and unfolded.

20. The light weight electric vehicle of claim 16, said vehicle includes a frame having a front frame section and said back frame section each include a pair of limbs which connect to generally form a V-shape.

21. The light weight electric vehicle of claim 19, wherein said front frame section and said back frame section each include a pair of limbs which connect to generally form a V-shape.

22. The light weight electric vehicle of claim 21, when said vehicle is unfolded said frame is generally X-shaped.

23. The light weight electric vehicle of claim 16, wherein said vehicle includes a frame which is arcurate.

24. The light weight electric vehicle of claim 21, wherein said limbs are arcuate.

25. The light weight electric vehicle of claim 16, wherein said vehicle includes a frame made of one of a composite laminate material and tubular metal material.

26. The light weight electric vehicle of claim 21, wherein said limbs are made of one of a composite laminate material and tubular metal.

27. The light weight electric vehicle of claim 20, wherein said vehicle includes a a pair of handles that can be used while the vehicle is driven or while the vehicle is folded.

28. The light weight electric vehicle of claim 20, wherein said vehicle includes a a parking brake handle that can be accessed while the driver is sitting in said vehicle and while said vehicle is folded.

29. The light weight electric vehicle of claim 16, wherein said vehicle includes a a kickstand.

30. The light weight electric vehicle of claim 16, wherein said drive motor independently drives rotation of a wheel.

* * * * *